(12) United States Patent
Stemme et al.

(10) Patent No.: US 6,546,804 B2
(45) Date of Patent: Apr. 15, 2003

(54) METHOD OF MAKING A PRESSURE SENSOR COMPRISING A RESONANT BEAM STRUCTURE

(75) Inventors: Goeran Stemme, Stockholm (SE); Edvard Kaelvesten, Haegersten (SE)

(73) Assignee: Radi Medical Systems AB, Uppsala (SE)

( * ) Notice: Subject to any disclaimer, the term of this patent is extended or adjusted under 35 U.S.C. 154(b) by 0 days.

(21) Appl. No.: 09/733,944

(22) Filed: Dec. 12, 2000

(65) Prior Publication Data

US 2002/0157473 A1 Oct. 31, 2002

Related U.S. Application Data

(62) Division of application No. 09/219,794, filed on Dec. 23, 1998, now Pat. No. 6,182,513.

(51) Int. Cl.$^7$ .............................................. G01L 11/00
(52) U.S. Cl. ....................................................... 73/704
(58) Field of Search .......................... 73/702, 704, 715, 73/716, 717, 719, 720, 721, 722, 723, 725, 726, 727; 437/7, 248

(56) References Cited

U.S. PATENT DOCUMENTS

| | | | |
|---|---|---|---|
| 4,141,253 A | 2/1979 | Whitehead, Jr. | 73/727 |
| 4,884,450 A | 12/1989 | Greenwood et al. | 73/702 |
| 4,897,360 A | 1/1990 | Guckel et al. | 437/7 |
| 5,013,693 A | 5/1991 | Guckel et al. | 437/248 |
| 5,090,254 A | 2/1992 | Guckel et al. | 73/862.59 |
| 5,188,983 A | 2/1993 | Guckel et al. | 437/209 |
| 5,226,423 A | 7/1993 | Tenerz et al. | 128/673 |
| 5,305,643 A | 4/1994 | Thomas et al. | 73/704 |
| 5,317,917 A | 6/1994 | Dufour | 73/702 |
| 5,747,705 A | 5/1998 | Herb et al. | 73/702 |
| 5,772,322 A | 6/1998 | Burns et al. | 374/118 |
| 5,808,210 A | 9/1998 | Herb et al. | 73/862.59 |

FOREIGN PATENT DOCUMENTS

| | | |
|---|---|---|
| DE | 40 39 846 A1 | 6/1992 |
| EP | 0 244 086 | 4/1987 |
| EP | 0 506 554 A1 | 9/1992 |
| EP | 0 557 216 A1 | 8/1993 |
| EP | 0 649 009 A2 | 4/1995 |
| EP | 0 672 897 A2 | 9/1995 |

OTHER PUBLICATIONS

E. Kalvesten, et al., "The First Surface Micromachined Pressure Sensor for Cardiovascular Pressure Measurements", Inst. Lab., 1988 IEEE, pp. 574–579. (No mo.).

Primary Examiner—William Oen
(74) Attorney, Agent, or Firm—Foley & Lardner (57) ABSTRACT

A resonant microbeam pressure sensor is disclosed, comprising a microbeam suspended by a diaphragm at one or more points by suspension elements. Pressure applied to the diaphragm will cause the resonance frequency of the beam to shift. This shift is detectable and proportional to the pressure. The device is manufactured by surface micromachining.

13 Claims, 10 Drawing Sheets

METHOD OF MAKING A PRESSURE SENSOR COMPRISING A RESONANT BEAM STRUCTURE

This application is a divisional of Ser. No. 09/219,794, filed Dec. 23, 1998, now U.S. Pat No. 6,182,513.

BACKGROUND OF THE INVENTION

1. Field of the Invention

The present invention relates to the field of semiconductor and micromechanical devices and processing techniques therefor, and particularly to resonance sensors, and to the manufacture of resonating structures for such sensors for pressure measurements.

2. Description of Related Art

Ultra miniaturized sensors for minimal invasive use have become important tools in for example hear surgery and diagnosis during the last ten years. So far optical or piezoresistive principles have been employed and sensors based on these technologies are commercially available. However, the known sensors suffer from some drawbacks. In particular calibration is fairly complicated and also the manufacture is not an easy task with fairly high rejection rates of finished products. Therefore there is a search for new types of sensors and other means and methods of making ultra miniaturized sensors in an efficient and economic way.

In U.S. Pat. No. 5,747,705 (Herb et al) there is disclosed a method of making a thin film resonant microbeam structure, and in U.S. Pat. No. 5,808,210 (ibid) there is disclosed such a resonant microbeam sensor.

By performing this known method one obtains a resulting device usable as a sensor for pressure and/or temperature measurements. It comprises a substrate, a cavity formed in the substrate usable as a reference cavity, a composite diaphragm structure covering said reference cavity, wherein the diaphragm comprises two layers. A first layer of said composite diaphragm forming a top wall or cover of said reference cavity is provided with at least two parallel slits, such that a resonating portion of said layer is formed. This resonating portion which is referred to as a "microbeam", is an integral part of said first layer. There is also provided a second layer of said diaphragm, deposited on top of said first layer, but with provisions made for forming a small cavity directly above this resonating portion.

However, there are certain limitations to this structure, in particular the fact that the beam is a part of the composite diaphragm. Thus, the entire diaphragm structure will necessarily always be thicker than the beam. This will adversely affect the sensitivity of the sensor.

U.S. Pat. No. 5,090,254 and U.S. Pat. No. 5,188,983 (both Guckel et al) relate to polysilicon resonating beam force transducers and the manufacture thereof. A transducer according to these disclosures comprises a substrate, a cavity formed in the substrate, a polysilicon beam firmly mounted to the substrate, and an encapsulating shell surrounding the beam. Pressure is measured by providing the substrate as a diaphragm of a pressure sensor and subjecting the substrate to the environment where pressure is desirable to be measured. The transducers obtainable by the teachings therein suffer from a limitation in that they cannot be sufficiently miniaturized for certain applications, such as a pressure sensor for use in coronary vessels. In particular it is explicitly said that the beams can be made to thicknesses in the range "of a few microns". For the mentioned applications this is by far too thick, and it would be desirable to have access to beams exhibiting a thickness of 1 $\mu$m or even less, say 0,5 $\mu$m. Furthermore, if the force transducer as disclosed in this patent should be applied for pressure measurement, in fact what is referred to as the "substrate" in this patent, would have to be used as a flexible diaphragm. This would necessarily mean that the components of the transducer would have to be miniaturized far beyond what is reasonable. In order to make such a structure, if indeed at all possible, back side etching and a complicated sealing technique would have to be used.

In U.S. Pat. No. 4,884,450 there is disclosed a pressure sensor for use in gas or oil well logging. It includes a resonator element mounted on an optical fiber ferrule. The resonator is located in an evacuated cavity and is mounted on a flexible diaphragm, whereby pressure changes may be detected as changes in the resonant frequency.

This disclosure teaches a resonator member in the form of a single crystalline silicon structure. The resonator structure is made as a separate unit by selective etching from a body of single crystal silicon. The diaphragm assembly is mounted to a substrate, actually a ferrule incorporating an optical fiber for excitation and signal transmission purposes, via a peripheral flange e.g. by electrostatic bonding. This substrate is made of boro-silicate glass. Thus, the entire device is made by assembling two separate parts, the diaphragm/beam unit and the substrate (ferrule). This is a very difficult operation if one wants to achieve a proper vacuum, as required for adequate resonance of the beam to occur. Especially if it is desired to make the sensor in the dimensions necessary for employment in e.g., coronary vessel or other locations of similar size. Another drawback with this device is to be found in the selection of materials. Glass in general degasses, i.e. releases gaseous substances into the surrounding, at temperatures of about 400° C. normally necessary to a glass to silicon.

SUMMARY OF THE INVENTION

Thus, there is a need for improved resonant beam sensor devices for such applications where miniaturization is of utmost importance. The prior art devices fail to meet these dimensional requirements, or they suffer from sensitivity limitations.

Therefore an object of the present invention is to provide ultraminiaturized sensors having high sensitivity, which are possible to manufacture in a cost efficient manner.

This and other objects are met with a method and a device as defined in the attached claims.

In particular the sensors are manufactured by a method using surface micromachining techniques, and comprises the steps of forming a diaphragm on a silicon substrate to define a cavity between said substrate and said diaphragm, forming at least one suspension element depending from said diaphragm into said cavity, and forming a resonant beam member suspended in said diaphragm in at leas one point of attachment by said suspension element.

In a further aspect there is provided a resonant microbeam pressure sensor comprising a substrate, a flexible diaphragm provided on said substrate such as to form a cavity between said substrate and said diaphragm, at least one resonant microbeam suspended in said diaphragm in at least one point, wherein said microbeam is located entirely beneath said diaphragm.

In still a further aspect there is provided a microbeam structure for a resonance sensor, comprising a sheet of polysilicon, at least one attachment element for attaching to a diaphragm of said sensor, said attachment element having a finite length and enough stiffness to provide a lever for transferring mechanical stress from said diaphragm to said microbeam structure, wherein said microbeam structure has a resonance frequency that significantly differs from that of the diaphragm to which it is to be attached.

The invention will now be described in greater detail with reference to the drawings.

Any reference to the relative positions of individual elements are to be interpreted with reference to the orientation of the devices as shown in the drawings.

DESCRIPTION OF PREFERRED EMBODIMENTS

Figure 1A:
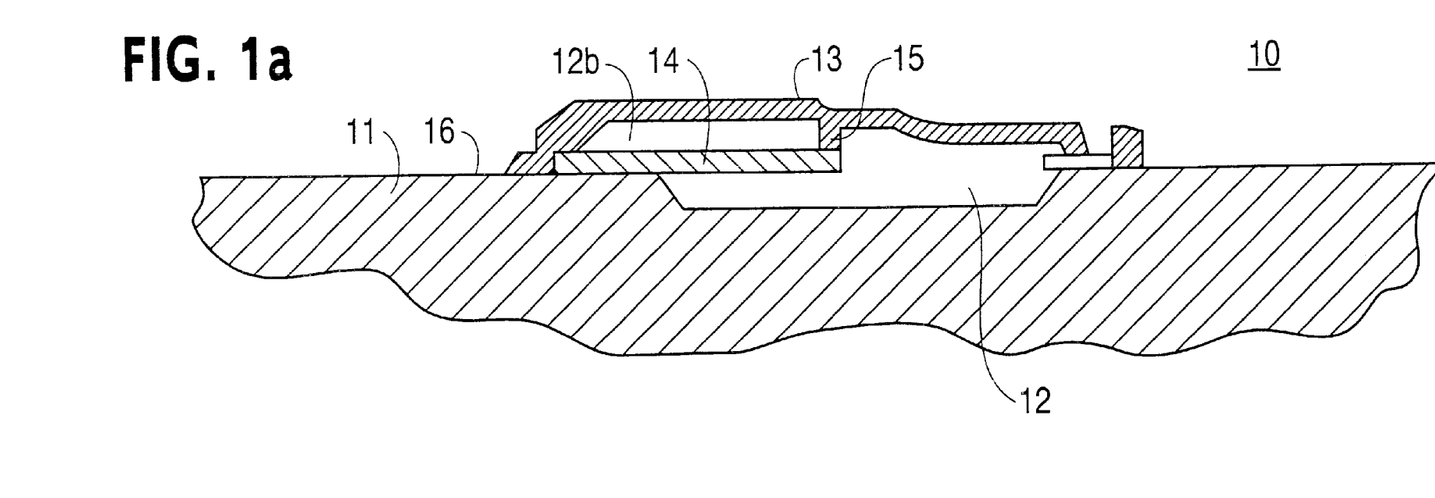
FIG. 1a is a cross section of a first embodiment of a sensor according to the present invention.

FIG. 1a shows a cross section of an embodiment of the present thin film resonant microbeam sensor device 10 according to the present invention. It comprises a substrate 11 of <100> silicon, in which there has been formed a depression by surface micromachining, sacrificial oxide, etching and reactive sealing. Covering the depression ere is a diaphragm 13 of amorphous silicon. In this embodiment the diaphragm structure is slightly elevated from the upper surface 16, and thus a vacuum cavity 12, 12b is formed between diaphragm 13 and subsume 11. It would of course be conceivable, to make a structure where the membrane is located essentially in the same plane as the surrounding substrate. Within the cavity 12 a resonant beam member 14 is provided suspended at one end of its ends by a suspension member 15 connecting the beam with the diaphragm 13, and at its other end attached to the substrate 11. Thus, the entire surface of the beam 14 is spaced from both the diaphragm 13 and the substrate, respectively by a certain selectable distance, by providing suspensions 15 of appropriate length, which is a very important aspect of the invention, since it enables the sensitivity of the sensor to be controlled and increased. I.e., both the distance above the beam 14 and below is selectable the distance below by controlling the depth of the cavity. This will be discussed further below. Thus, the beam 14 is free to vibrate inside the cavity 12. It should be noted that the area indicated with reference numeral 12b is part of the cavity 12 and is in complete communication therewith. Pressure applied to the top side of the diaphragm 13 deforms the diaphragm and causes the beam 14 to stretch, thereby changing its resonance behavior, e.g. the resonance frequency of the beam will change.

The beam can have a number of different shapes. It could be rectangular, triangular hexagonal, octagonal, circular, etc., just mention a few possibilities, and it may also comprise slots of various shapes. It should also be noted that the edges of the beam member 14 is spaced from the walls in the cavity 12, and thus the edges of the beam are free to move except at the suspension points.

Figure 1B:
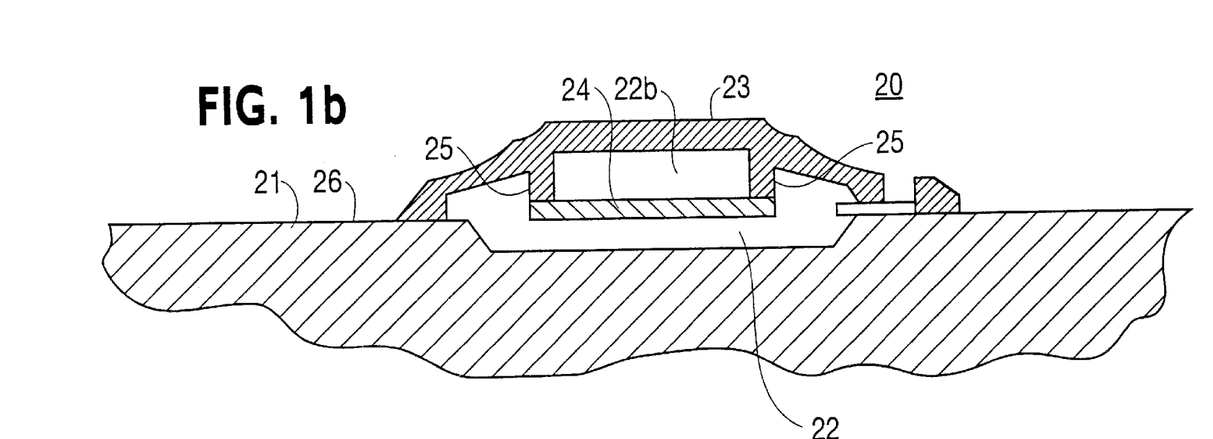
FIG. 1b is a cross section of a second embodiment of a sensor according to the present invention.

FIG. 1b shows another embodiment of the sensor device. It comprises the same basic elements as the embodiment in FIG. 1a, i.e. a substrate 21, a depression forming a cavity 22, 22b, a diaphragm structure 23, and a resonant beam member 24. However, in contrast to the embodiment of FIG. 1a, the resonant beam member 24 is suspended at both its ends by suspension elements 25 connecting with the diaphragm 23. In all other respects the structure of this embodiment is the same as that of FIG. 1a. The fact that the beam 24 is entirely suspended by the diaphragm has certain advantages that will be discussed later.

Figure 2:
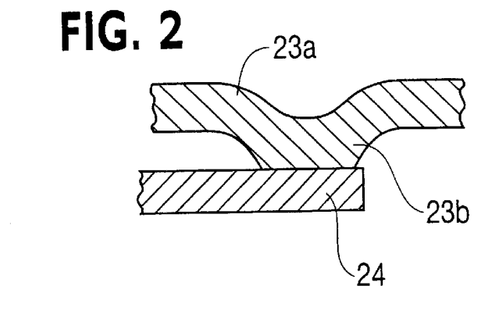
FIG. 2 is a detail of a suspension element.

It should be noted that the suspension elements 15, 25 although they are referred to as elements, may form a part of the diaphragm. Either as indicated in FIGS. 1 and 2, where they form separate projections depending from the diaphragm, or by shaping the diaphragm so as to form an attachment connecting said microbeam to said diaphragm in a spaced part relationship. This is illustrated in FIG. 2, where a diaphragm 23 is formed with a bulge like portion 23b attaching to a beam member 24.

An important aspect of the beam design, at least for applications involving optical excitation, is that the resonance frequency of the beam and of the diaphragm respectively, must be well separated, preferably enough separated that the resonance frequencies of the mode of interest of the beam is lower than the frequency of the first mode of the diaphragm. A rigid or stiff structure gives higher resonance frequency than a weak one. The factors influencing the stiffness or rigidity of the beam are, in addition to the material properties, also thickness, length and geometric design.

The following can be said about these factors:

long beams have the lowest resonance frequencies a beam that is wider at the middle will have a lower resonance frequency a beam having four points of attachment provided at right angles relative to each other trebles the resonance frequency Suitably the resonance frequency of the beam is lower than the resonance frequency of the first mode of the diaphragm. However, it is to be understood that they can vary so long as the difference between the frequencies are large enough to render the device operative. By sufficiently large difference is meant that the resonance frequency of the diaphragm must be such that the detection of the beam resonance is not disturbed.

In FIGS. 3a–e various possible designs of the beam member are disclosed.

Figure 3A:
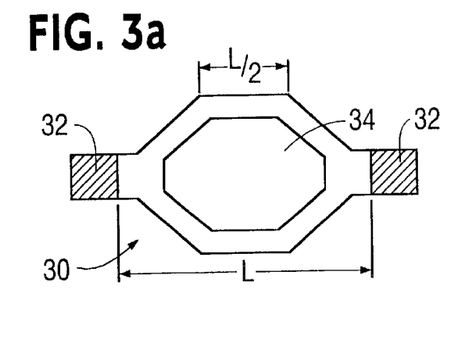
FIGS. 3a–c illustrate various embodiments of a microbeam structure according to the present invention.

FIG. 3a illustrates an embodiment of a beam 30 having two suspension points 32, one of which may be attached to the substrate (as in FIG. 1a), the other to the diaphragm via a suspension element (such as element 25 in FIG. 1b). Alternatively both suspension points may be attached to the diaphragm. The shape of the diaphragm is not critical, although the geometry indicated in FIG. 3a has certain advantages. Furthermore a portion 34 of the surface of th beam may be doped with boron or other doping compounds, in order that the beam will absorb heat easier and thereby enter into a resonant state. It should be noted that it is not strictly necessary to dope the beam if other means of excitation arc employed. The free length of the beam, i.e. the length L shown in the figure should preferably be twice the length of the wide portion of the beam, the length of which thus is L/2, although this is not critical to the function. If the beam according to this embodiment is made longer but maintaining the width thereof, it will have a lower resonance frequency, thus providing for better separation of diaphragm and beam frequencies, but instead the sensitivity will be reduce. Thus, there will always be a trade off between desired frequency and the desired sensitivity.

Figure 3B:
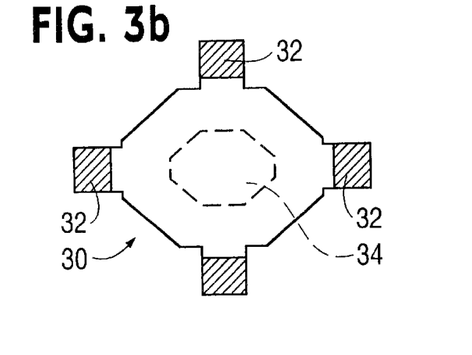

FIG. 3b illustrates an embodiment having four points of attachment 32. In principle all possible combinations of attachments are possible, e.g. all four points attached to the substrate, one or more attached to the substrate and the rest suspended by the diaphragm, or all four points attached to the diaphragm. In this embodiment the resonance frequency will increase as much as three times. Am advantage of this embodiment is that one can obtain different vibrations in different directions. This may be used to advantage by enabling pressure detection and temperature detection to be performed at the same time. Although this embodiment will have somewhat lower pressure sensitivity compared to the embodiment of FIG. 1a, there are some advantages with it. Thus, the beam will become symmetric within the sensor, whereby the diaphragm will have a better appearance; the beam will be slightly more isolated from the environment; the sensitivity to the method of manufacture is less; the beam is smaller, which could mean easier excitation, since there is a smaller mass to heat.

Figure 3C:
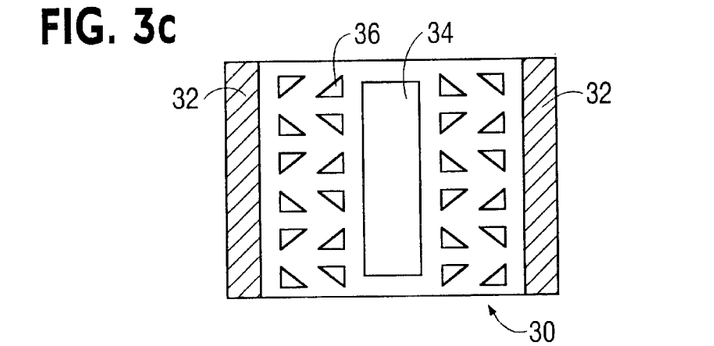

In FIG. 3c there is shown a still further embodiment of a beam member. It comprises a lattice work or crossbar structure. The lattice structure is made by forming slots 36 of preferably triangular shape in the beam 30. The slots could have other shapes too, although from a structural strength point of view the illustrated shapes are preferred. This embodiment provides for maintaining the stiffness laterally, while the stiffness in the longitudinal direction is reduced, whereby the resonance frequency is reduced. Also it reduces the tendency of the beam to tilt.

As can be seen in FIGS. 1 and 2, the suspension elements 15, 25 constitute the coupling between diaphragm 13, 23 and beam 14, 24. Thus, a deflection of the diaphragm when exposed to pressure will cause the suspension elements to be urged towards the periphery.

Figure 4A:
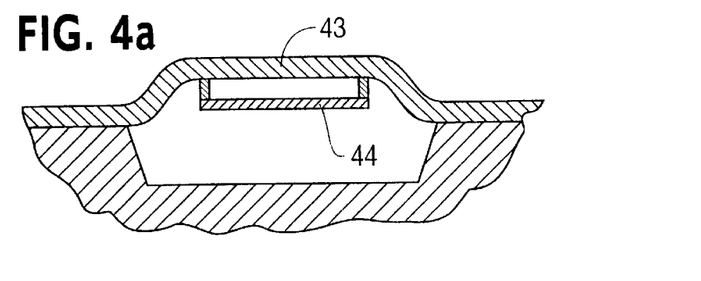
FIGS. 4a–c illustrates the function of a sensor according to the invention.
Figure 4B:
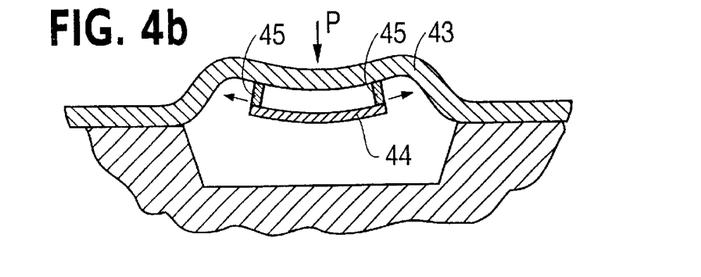

In FIGS. 4a–b this is shown schematically. FIG. 4a shows a diaphragm 43 unaffected by pressure, and FIG. 4b shows a pressure P being exerted on the diaphragm 43. When the diaphragm 43 bends down, the suspensions 45 must follow the movement of the diaphragm and thereby they exert a pulling force on the beam 44 in opposite directions, whereby the beam 44 will be subject to a stress and tend to become elongated, which will cause its resonance frequency to shift. The stress induced in the beam 44 by a given pressure will of course increase if the leverage provided by the suspension elements is increase. The important parameter for the lever action is the "average" distance between the center line of the diaphragm and the beam.

Figure 4C:
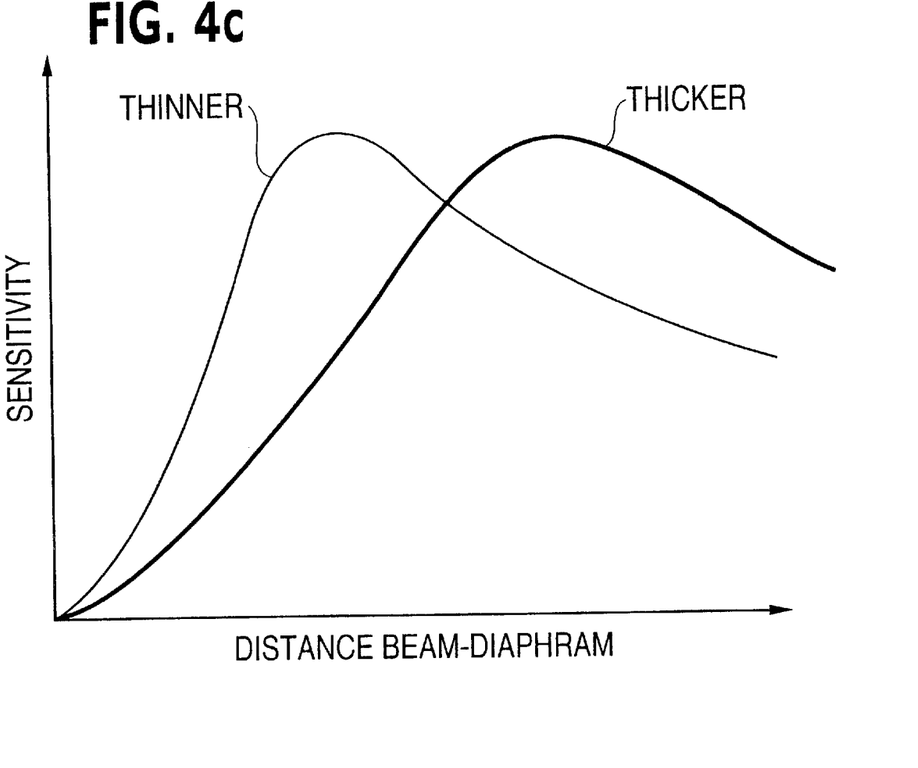

The leverage is optimized by controlling the length of the suspensions simply by making the suspensions 15, 25, 45 longer. However, there is an optimum for the sensitivity as a function of suspension length for a given set of other parameter, which is illustrated qualitatively in FIG. 4c, where the sensor sensitivity for two different thicknesses of the diaphragm is shown as a function of the distance between beam and diaphragm. The provision of a leverage by the suspension of the beam is a very important aspect of the invention, and provides significant advantages over the prior art device according to U.S. Pat. No. 5,808,210, where this is impossible because the beam forms part of the diaphragm itself. Put in other word, the resonating element according to U.S. Pat. No. 5,808,210 is completely located within the geometrical boundaries of the composite diaphragm and thus there is no freedom to influence the leverage.

Figure 5:
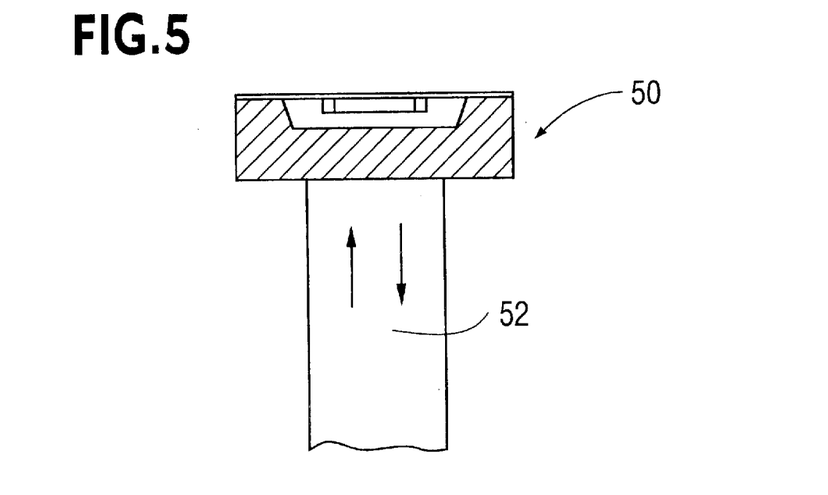
FIG. 5 schematically illustrates a sensor of the invention coupled to an optical fiber.

For the excitation of the beam to bring it to a resonating state it is contemplated to use optical energy, although other types of energy are possible. Thus, as shown schematically in FIG. 5, for optical excitation, a sensor chip 50 is mounted to the end of an optical fiber 52. A suitable excitation wavelength is about 1100 nm or more since the Si substrate is transparent in that range. Since the beam is doped it will absorb in this wavelength range and will thereby be excited. Especially 1300 nm is used, since it is a standard in the field of optics. For detection, a wavelength of 1550 nm is used.

Now the manufacture of a sensor according to the invention will be described with reference to FIGS. 6–17.

The sensor chips are made in a large number (about 70000) on one wafer of silicon, by various techniques, such as photo lithography, etching, deposition (LCVD), doping and oxidation.

Figure 6A:
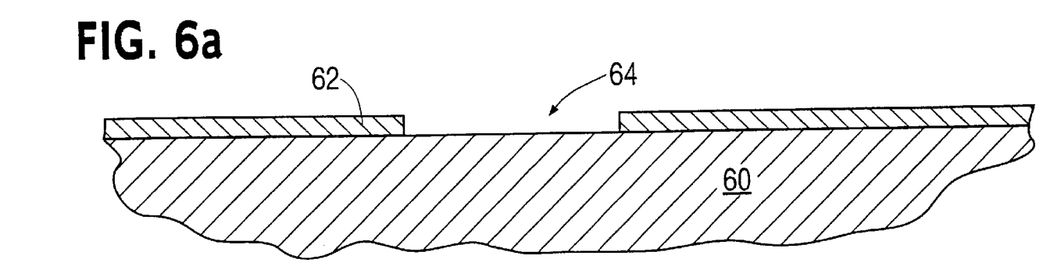
FIGS. 6–15 illustrate a sequence of steps of a manufacturing process for a sensor according to the present invention.
Figure 6B:
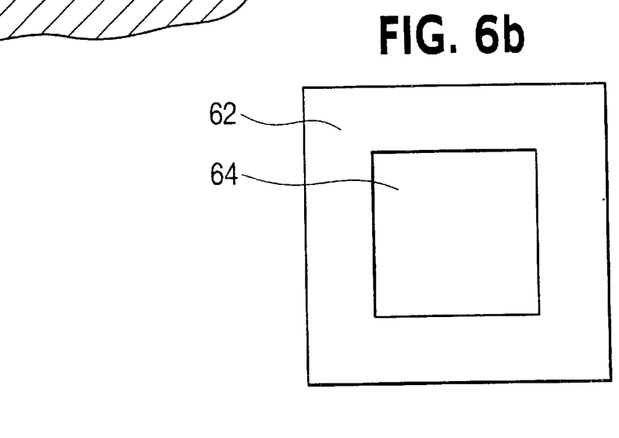
Figure 7:
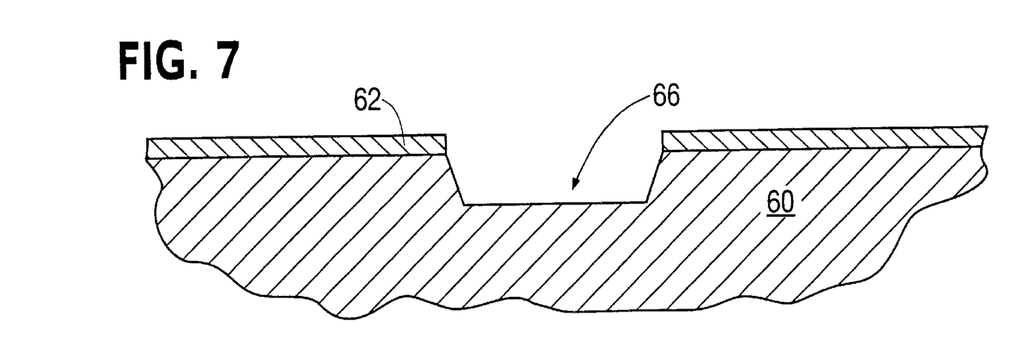
Figure 8:
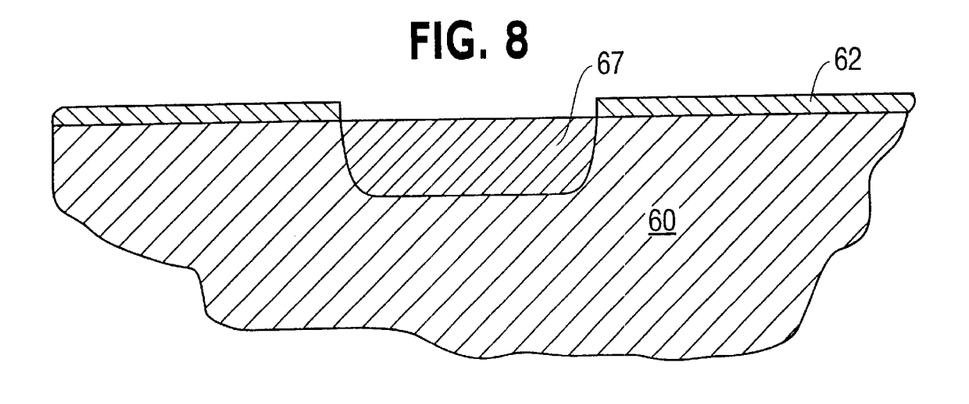
Figure 9A:
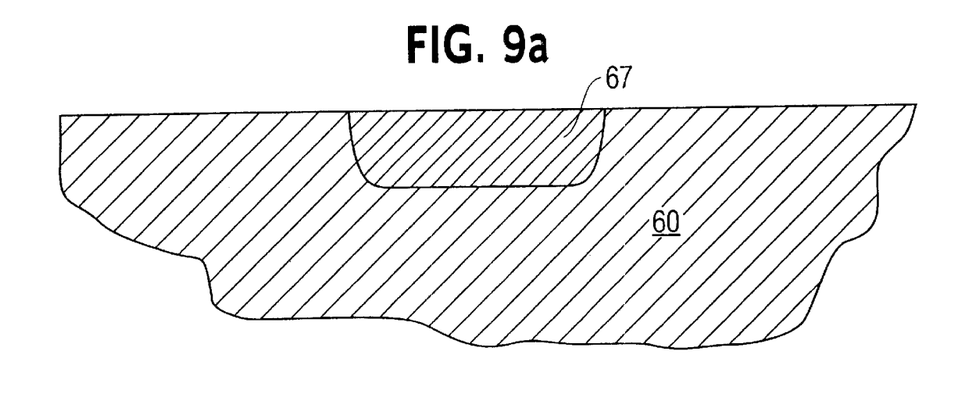
Figure 9B:
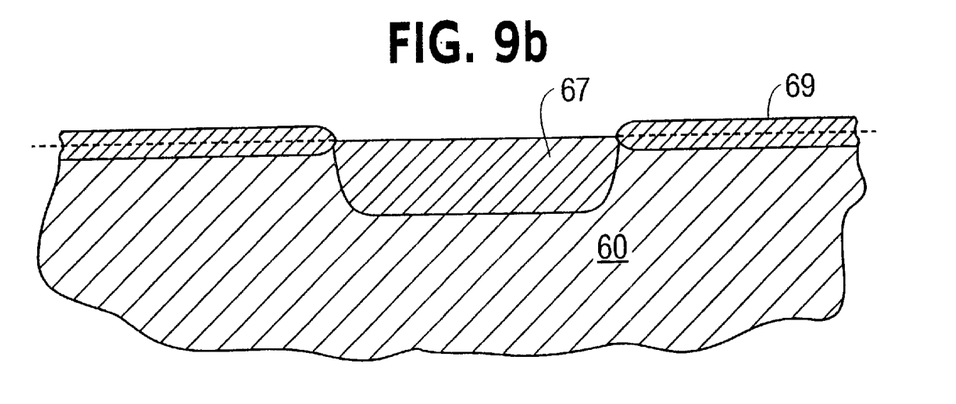
Figure 10A:
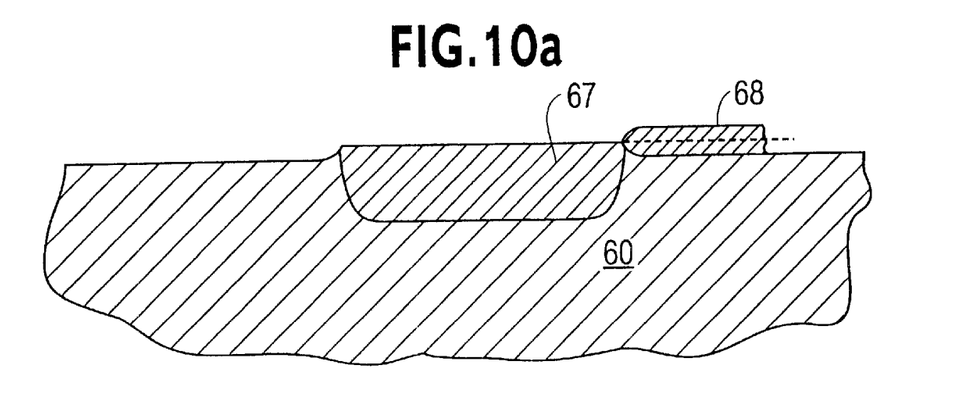
Figure 10B:
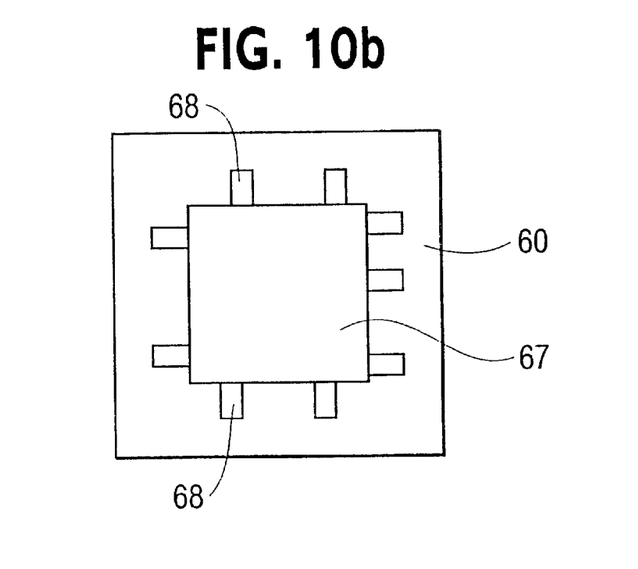

Thus, in a first step a disk 60 of <100> silicon is provided with a layer 62 of nitride about 2000 Angstrom thick by depositing, using LPCVD, onto the disk. Preferably a layer of oxide (e.g. TEOS) is deposited or grown first to avoid cracking of the nitride layer during deposition thereof. The nitride is masked to provide a template for a depression, using photo lithography, and by dry etching an opening 64 is made in the nitride layer 62 (see FIG. 6a; atop view is shown in FIG. 6b). Wet etching with KOH creates a depression 66, suitably about 700 nm deep in the substrate wafer 60 (FIG. 7). Then, the silicon exposed in the depression is thermally oxidized FIG. 8) whereby oxide is grown such that the depression is filled with oxide 67. The nitride layer is then selectively removed by etching, leaving the oxide 66 in the depression (FIG. 9a). In this state the top surface of the substrate and of the oxide in the depression are flush. Now the entire surface is thermally oxidized, whereby the silicon surrounding the depression region is oxidized and the oxide grows down into the substrate but also expands "upwards" (see FIG. 9b), such that the oxide surface 69 surrounding the depression area will be slightly elevated. The depression area and the portions representing etch channels are masked and the remaining oxide is etched away, leaving oxide structures defining the etch channels 68. Alternatively, the etch channels 68 are defined by lithography, i.e. by depositing a layer of TEOS on the entire surface, masking and etching away material to form oxide structures defining the channels 68 (FIGS. 10a and 10b).

Figure 11A:
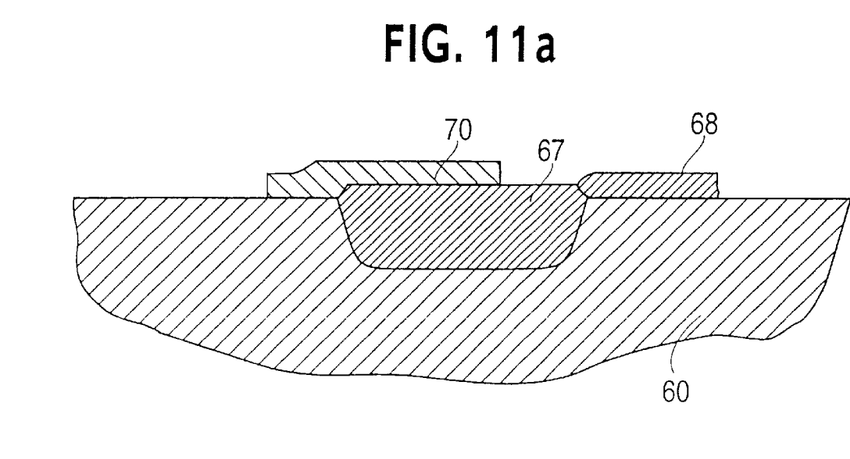
Figure 11B:
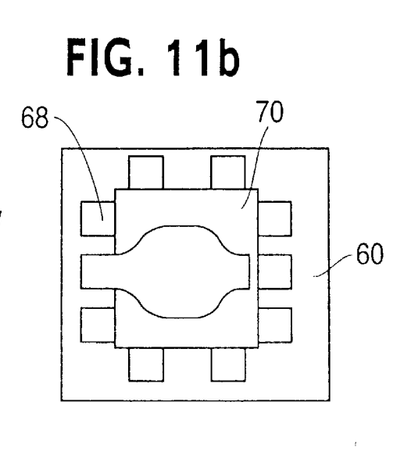
Figure 12A:
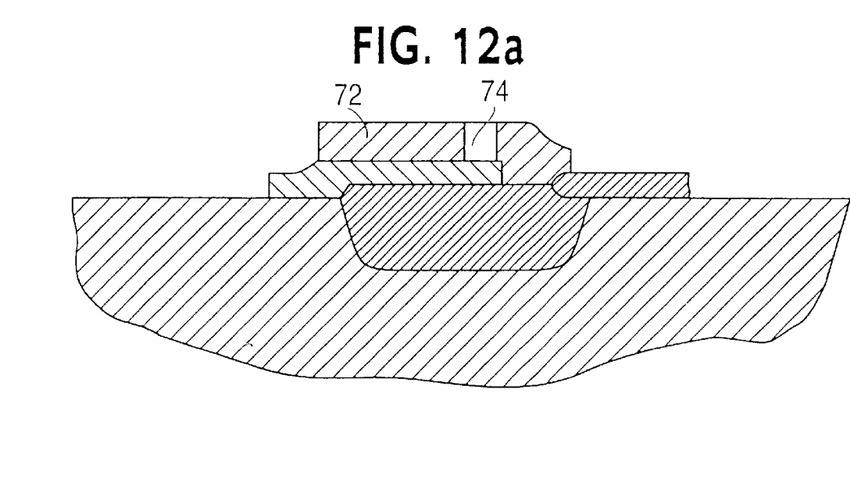
Figure 12B:
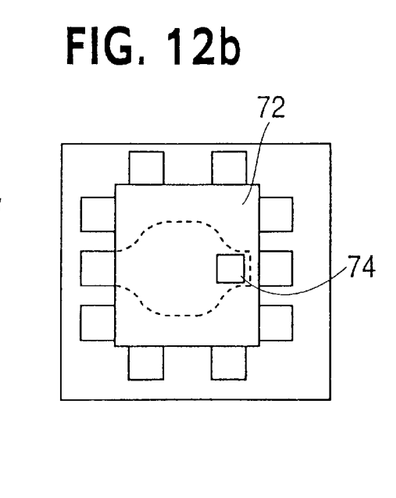

Next, a polysilicon beam is made by depositing a layer (thickness: 500–2000 nm) of polysilicon onto the surface, and then by lithography masking the surface leaving the pattern for a beam 70 (see FIG. 11b). The polysilicon not forming pat of the beam is removed by etching thereby leaving a structure 70 forming a beam member.

Figure 13:
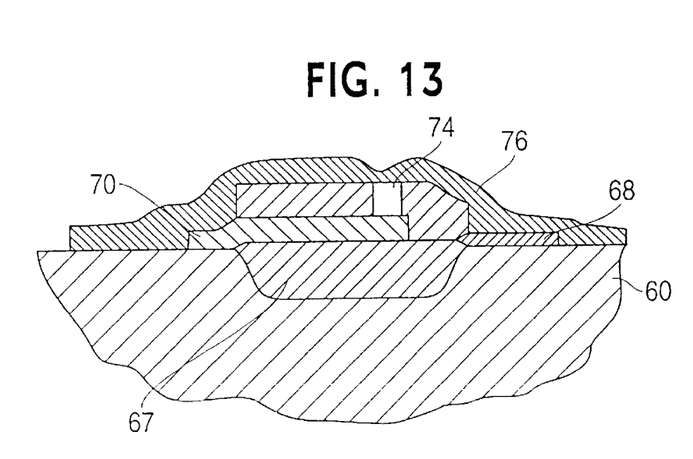
Figure 14:
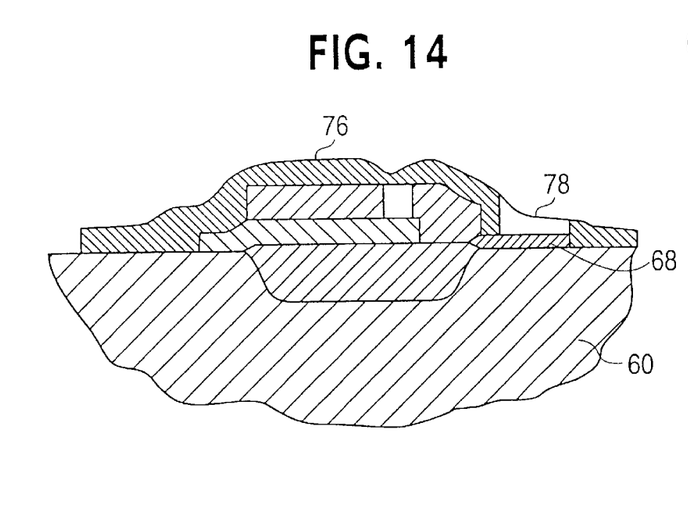
Figure 15:
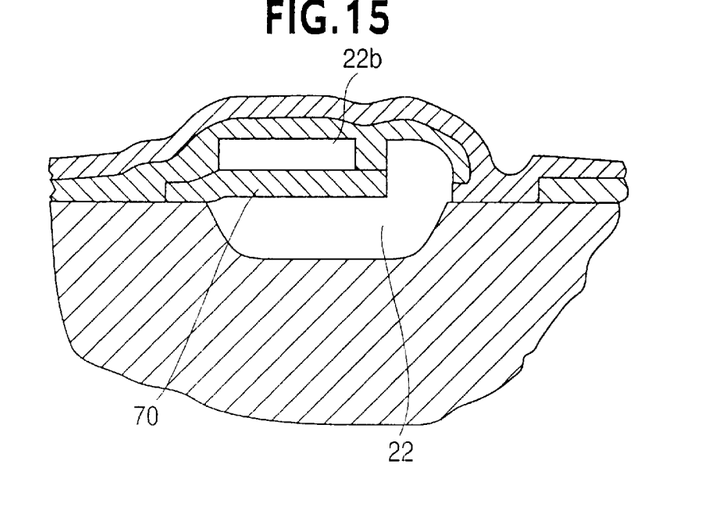
Figure 16:
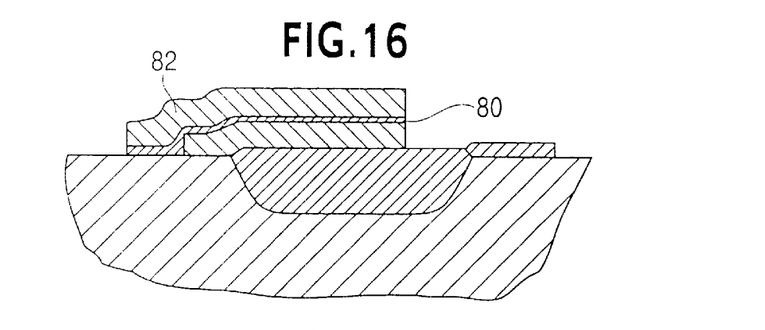
FIGS. 16–17 illustrate additional steps of the process for making a piezoresistive sensor.
Figure 17:
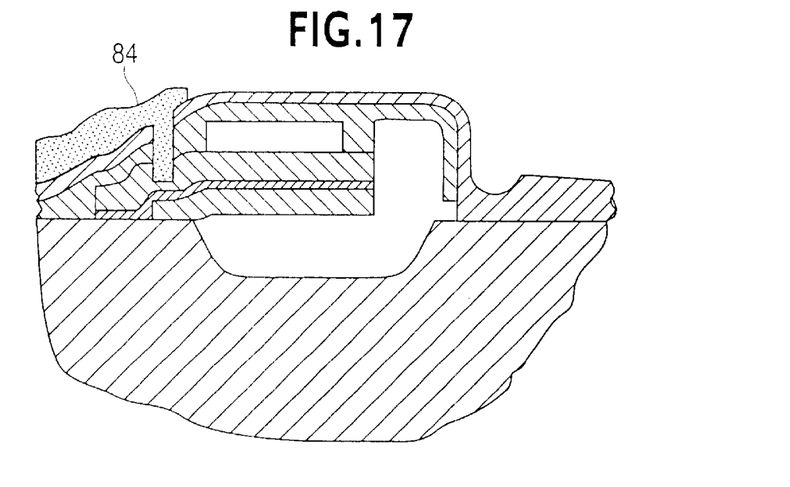

Next, an oxide layer is deposited over the entire structure, and a mask is applied onto the oxide layer defining the part 72 (22b in FIG. 1b) of the cavity (22 in FIG. 1b) above the beam (24 in FIG. 1b). The mask also defines a suspension element 74 (corresponding to 25 in FIG. 1b). The unwanted oxide material is etched away leaving the structure shown in FIG. 12. A layer 76 (500–1000 nm thick) of polysilicon is deposited over the entire structure resulting from the previous step (FIG. 13). A mask is applied by lithography and by etching of the polysilicon through said mask etching holes 78 are opened (FIG. 14) to the previously made etching channels 68 (FIG. 10).

Thereafter the oxide material inside the cavity and in the etching channels is removed by sacrificial etching, thereby providing a finished cavity surrounding the beam. Finally the structure is sealed, i.e. the etch channels are closed, by depositing a suitable material such as polysilicon or oxide, in vacuum over the entire surface, which yields the structure shown in FIG. 15.

The above described method of manufacturing a resonance sensor results in a structure suitable i.a. for optical excitation and detection. However, as indicted previously other means are available, e.g. piezoresistive detection. In order to make a sensor of the latter type, it is necessary to provide a piezoresistive member on the beam. This may be achieved by depositing a layer of a piezoresistive material, e.g. suitably doped polysilicon on the top of the structure resulting from the process steps described in connection with FIG. 11. However, before the piezoresistive layer is deposited, an insulating layer 80 of e.g. nitride is deposited. A mask is provided and the undesired areas of nitride are etched away. Then the polysilicon 82 is deposited, a mask is applied and the undesired material is etched away, leaving the structure shown in FIG. 16. On this structure preferably an insulating layer is deposited to protect against short circuit between piezoresistor and diaphragm. In order to make an electrical connection to the piezoresitor, a channel 84 is etched through the diaphragm down to the piezoresistor. To control the depth of the etch, i.e. in order not to etch through the piezoresistor, the time of the etch is carefully controlled. Then metal is deposited over the surface to fill tie channel. Unwanted metal is etched away by suitable masking.

The last step is a passivation step including deposition of an insulating layer on the metal in order for the metal not to interact electrically with the environment and cause short-circuit and other problems.

Figure 18:
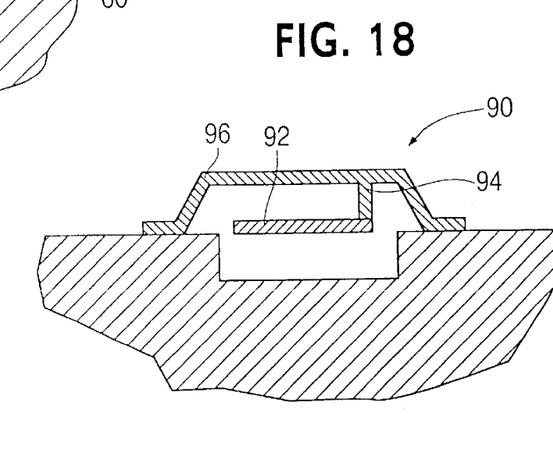
FIG. 18 is a cross section of a temperature sensitive resonant beam structure.

In FIG. 18 a resonant beam structure 90 is shown where the microbeam 92 is suspended in only one single point, e.g. a suspension element 94, and attached to the diaphragm 9. This structure will not be pressure sensitive, but am be used for temperature measurements.

What is claimed is:

1. A method for making a thin film resonant pressure sensor comprising a flexible diaphragm, and at least one microbeam member suspended in at least one suspension point in said diaphragm; comprising the steps of:
   forming a diaphragm on a silicon substrate to define a cavity between said substrate and said diaphragm;
   forming at least one suspension element depending from said diaphragm into said cavity; and
   forming a resonant beam member suspended in said diaphragm in at least one point of attachment by said suspension element.

2. The method as claimed in claim 1, wherein said diaphragm and said suspension element are formed simultaneously in one deposition step.

3. The method as claimed in claim 2, wherein said suspension element is part of said diaphragm.

4. The method as claimed in claim 1, wherein said cavity is defined by providing etchable material on said substrate having a shape corresponding to said cavity.

5. The method as claimed in claim 1, wherein said resonant beam member(s) is embedded i said cavity defining material, by providing said etchable material in two steps and forming said beam between said two steps.

6. The method as claimed in claim 5, wherein said diaphragm and said suspension element(s) are formed after the step of embedding said resonant beam member.

7. The method as claimed in claim 1, wherein said cavity is formed by making a recess in said substrate and by forming said diaphragm over said cavity.

8. The method as claimed in claim 1, wherein said cavity is formed by forming the diaphragm to define said cavity on a flat substrate.

9. The method as claimed in claim 1, wherein there is provided two or more suspension elements and wherein said beam is suspended entirely in said diaphragm.

10. A method for making a thin film resonant pressure sensor comprising a flexible diaphragm, having a microbeam member suspended in at least one suspension point in said diaphragm, comprising the steps of:
    forming a depression in a silicon substrate;
    filling the depression with silicon dioxide to define a first cavity region;
    forming an oxide layer on the silicon substrate;
    forming a masking layer defining etch channels leading into said first cavity region;
    etching the unmasked oxide areas to leave oxide projections defining said channels;
    forming a polysilicon layer;
    masking the polysilicon layer to define at least one beam;
    etching the polysilicon layer to form said beam;
    forming an oxide layer over said at least one beam;
    masking said oxide layer to define, together with said first cavity region, a cavity region surrounding said beam, and to define a hole through said oxide extending down to said beam;
    etching said oxide layer to form said cavity region and said hole;
    forming a polysilicon layer over the cavity region thereby filling said hole to provide a diaphragm and a suspension member connecting the beam to the diaphragm;
    forming an etch hole in said diaphragm connecting to said etch channels;
    applying sacrificial etching to remove all oxide material defining the cavity to form said cavity; and
    sealing the etch channels.

11. A method for making a thin film resonant pressure sensor comprising a flexible diaphragm, having a microbeam member suspended in at least one suspension point in said diaphragm, comprising the steps of:
    forming an oxide layer on a silicon substrate;
    masking said oxide layer to define a first cavity region;
    etching to make said first cavity region;
    forming an oxide layer;
    masking to define etch channels leading into the first cavity region;
    etching the unmasked oxide areas to leave oxide projections defining said channels;
    forming a polysilicon layer;
    masking the polysilicon layer to define at least one beam;
    etching the polysilicon layer to form said beam;
    forming an oxide layer over said at least one beam;
    masking said oxide layer to define, together with said first cavity region, a cavity region surrounding said beam, and to define a hole through said oxide extending down to said beam;

etching said oxide layer to form said cavity region surrounding said beam, and said hole;

forming a polysilicon layer over the cavity region thereby filling said hole to provide a diaphragm and a suspension member connecting the beam to the diaphragm;

forming an etch hole in said diaphragm connecting to said etch channels;

applying sacrificial etching to remove all oxide material defining the cavity to form said cavity; and sealing the etch channels.

12. A method for making a thin film resonant pressure sensor comprising a flexible diaphragm, having a micro-beam member suspended in at least one suspension point in said diaphragm; comprising the steps of:

forming a masking layer on a silicon substrate to define a depression region in the substrate;

etching away silicon from the unmasked area to form a depression;

thermally oxidizing the silicon in said depression to fill the depression with silicon dioxide so as to define a first cavity region;

etching away the masking layer to expose the silicon substrate;

forming an oxide layer on the silicon substrate;

masking to define etch channels leading into said first cavity region;

etching the unmasked oxide areas leaving oxide projections defining said channels;

depositing a layer of polysilicon;

masking the polysilicon layer to define at least one beam said beam at least partially being located in said first cavity region;

etching the polysilicon layer thereby removing all material surrounding the beam defining area to form said at least one beam;

forming an oxide layer over said at least one beam;

masking said oxide layer to define, together with said first cavity region, a cavity region surrounding said beam, said to define a hole through said oxide extending down to said beam;

etching said oxide layer to form said cavity region and said hole;

forming a polysilicon layer over the cavity region thereby filling said hole to provide a diaphragm and a suspension member connecting the beam to the diaphragm;

masking to define an etch hole connecting to said etch channels;

etching the polysilicon to open said hole;

applying sacrificial etching to remove all oxide material defining the cavity to form said cavity; and sealing the etch channels.

13. A method for making a thin film resonant pressure sensor comprising a flexible diaphragms, having a micro-beam member suspended in at least one suspension point in said diaphragm; comprising the steps of:

forming an oxide layer on a silicon substrate;

masking to define a first cavity region in the substrate;

etching away silicon from the unmasked area to form said first cavity region;

forming an oxide layer on the silicon substrate;

masking to define etch channels leading into the first cavity region;

etching the unmasked oxide areas leaving oxide projections defining said channels;

depositing a layer of polysilicon;

masking the polysilicon layer to define at least one beam, said beam at least partially being located in said first cavity region;

etching the polysilicon layer they removing all material surrounding the beam defining area to form said at least one beam;

forming an oxide layer over said at least one beam;

masking said oxide layer to define, together with said first cavity region, a cavity region surrounding said beam, and to define a hole through said oxide extending down to said beam;

etching said oxide layer to form said cavity region surrounding said beam, and said hole;

forming a polysilicon layer over the cavity region thereby filling said hole to provide a diaphragm and a suspension member connecting the beam to the diaphragm;

masking to define an etch hole connecting to said etch channels;

etching the polysilicon to open said hole;

applying sacrificial etching to remove all oxide material defining the cavity to form said cavity; and sealing the etch channels.

* * * * *